(12) United States Patent
Johnson et al.

(10) Patent No.: US 6,535,323 B2
(45) Date of Patent: Mar. 18, 2003

(54) LIGHT-SWITCHING DEVICE

(75) Inventors: Mark Thomas Johnson, Eindhoven (NL); Paul Van Der Sluis, Eindhoven (NL); Anna-Maria Janner, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/965,415

(22) Filed: Sep. 27, 2001

(65) Prior Publication Data

US 2002/0036816 A1 Mar. 28, 2002

(30) Foreign Application Priority Data

Sep. 28, 2000 (EP) .............................. 00203378

(51) Int. Cl.[7] .............................................. G02F 1/153
(52) U.S. Cl. ..................... 359/275; 359/254; 359/263; 359/267
(58) Field of Search ................. 359/242, 245, 359/247, 250–252, 254, 263, 267, 275, 315, 318, 320

(56) References Cited

U.S. PATENT DOCUMENTS

| 4,264,147 A | * | 4/1981 | Baur et al. ..................... 349/70 |
| 4,465,339 A | * | 8/1984 | Baucke et al. ............... 359/274 |
| 4,684,939 A | * | 8/1987 | Streit .......................... 345/102 |
| 5,507,936 A | * | 4/1996 | Hatschek et al. ........... 204/412 |
| 5,905,590 A |   | 5/1999 | Van Der Sluis et al. .... 359/275 |

* cited by examiner

Primary Examiner—Jordan M. Schwartz
Assistant Examiner—Jessica Stultz

(57) ABSTRACT

The invention relates to a switching device having shorter switching times. The device comprises a switchable layer (3), which is switched between a reflecting and an absorbing state by changing a hydrogen content of the switchable layer (3). Applying a DC voltage on electroconductive layers (11, 13) changes the hydrogen content. These electroconductive layers (11, 13) sandwich a stack of layers comprising the switchable layer (3) and a hydrogen storage layer (9). The hydrogen storage layer comprises essentially the same compounds as the switchable layer (3), viz. $LMgH_x$ and preferably $GdMgH_x$. The storage layer may be made thin, leading to relatively short hydrogen transportation times and a relatively fast display. The device may be further improved by applying a scattering foil.

6 Claims, 2 Drawing Sheets

LIGHT-SWITCHING DEVICE

FIELD OF TECHNOLOGY

The invention relates to a light-switching device which is reversibly switchable between at least a first state of reflecting light and a second state of absorbing light, said device comprising a stack of layers including a switchable layer of an optically switchable material which brings about a switch from the first state to the second state of the device by changing a density of hydrogen.

BACKGROUND AND SUMMARY

U.S. Pat. No. 5,905,590 describes a switching device comprising a switching film including hydrides of magnesium with other trivalent metals. By exchange of hydrogen, the switching film can be reversibly switched from a transparent state to a mirror-like state with zero transmission via an intermediate black absorbing state. The switching film is comprised in a stack of layers, which is deposited on a transparent substrate. By virtue of the optical effect, the device may be used as an optical switching element, for example as a variable beam splitter, optical shutter, and for controlling the illuminance or the shape of light beams in luminaires. The switching device may also be used for data storage and in optical computing, and in applications such as architectural glass, vision control glass, sunroofs and rearview mirrors. By making a pattern in the switching film and providing the patterned switching film with transparent electrodes, a thin display can be manufactured.

It is a problem with these types of devices that they are relatively slow, because the speed of the switching effect is determined by the transport of hydrogen.

It is an object of the invention to provide a switching device, which has an improved speed. To this end, the invention is characterized in that the stack further includes a layer for storing hydrogen which comprises a material comprising essentially the same compounds as the switchable layer. The switching material has an excellent hydrogen storage capacity in the non-transparent state. Since the device is only switched between the reflective and the absorbing state, the hydrogen storage layer may be non-transparent and the switching material may be used for this purpose. In view of the high storage capacity of the switching material, the storage layer can be made thinner when the switching material is also used for the storage layer, which, leads to shorter diffusion times for the transportation of hydrogen and consequently a device with increased switching speed. Moreover, for switching between the reflecting and the absorbing state, less charge needs to be transported, i.e. less current is required for switching.

Advantageous embodiments of the invention are described in the dependent claims.

These and other aspects of the invention will be elucidated with reference to the embodiments described hereinafter.

BRIEF DESCRIPTION OF DRAWINGS

In the drawings.

In general, like reference numerals identify like elements.

DETAILED DESCRIPTION OF DRAWINGS

Figure 1A:
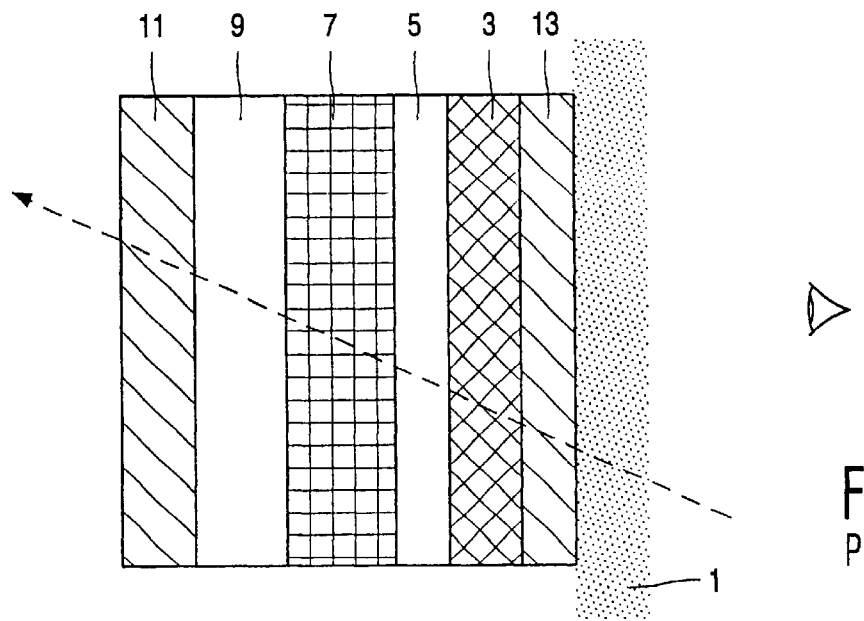
FIGS. 1A, 1B are cross-sections of a stack of layers of a switching mirror display according to the prior art.
Figure 1B:
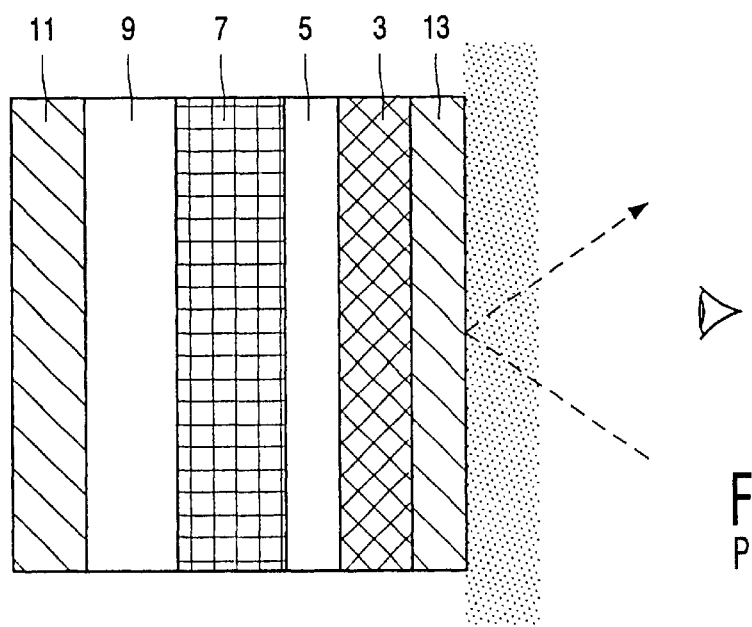

FIGS. 1A, 1B are cross-sections of a switching mirror device according to the prior art. The layer thicknesses are not drawn to scale. The device comprises a transparent glass plate 1 on which a stack of layers is deposited by means of conventional methods, such as vacuum evaporation, sputtering, laser ablation, chemical vapor deposition or electroplating. The stack comprises a layer 3 of $LMgH_x$ as a switching film with a thickness of about 200 nm (L represents Ni, Sc or Y or an element from the Lanthanide series of the Periodic System of Elements), a palladium layer 5 with a thickness of about 5 nm, an ion-conducting electrolyte layer 7 with a thickness in the range of 0.1 to 10 $\mu$m and a hydrogen storage layer 9.

$GdMgH_x$ is a very suitable switching material, as far as optical properties and switching time are concerned, but other trivalent magnesium-lanthanide alloys might be employed as well. The switching film 3 may be reversibly switched between a low-hydrogen (x<~2) composition and a saturated high-hydrogen (x~5) composition, via a medium hydrogen composition. The various compositions have different optical properties. At a low hydrogen content, the film has a metallic character and is non-transparent. The film then reflects like a mirror. At a high hydrogen content, the film 3 is semiconductive and transparent, whereas at intermediate hydrogen concentration the switching film is absorbing.

The palladium layer 5 serves to increase the rate of hydriding or dehydriding, and thus the switching speed. Other electro-catalytic metals or alloys, such as platinum or nickel might also be used. In addition, this metal layer protects the underlying switching film 3 against corrosion by the electrolyte. The palladium layer 5 may have a thickness in the range between 2 and 25 nm. Thin layers of 2 to 10 nm are preferred, however, because the thickness of the film determines the maximum transmission of the switching device.

For a proper functioning, also an H-storage layer 9 and an H-ion conducting electrolyte layer 7 are required. A good H-ion conductor electrolyte is $ZrO_2H_x$. The electrolyte must be a good ion conductor, but it must be an isolator for electrons in order to prevent self-discharge of the device. Use is most preferably made of transparent solid-state electrolytes, because of the simplicity of the device; they prevent sealing problems, and the device is easier to handle.

If the transparent state of the switching mirror is required, a good candidate for the storage layer is $WO_3$.

The stack is sandwiched between two transparent electroconductive electrode layers 11, 13 of, for example, indium-tin oxide (ITO). Electrode layers 11, 13 are connected to an external current source (not shown). By applying a DC current, the low-hydrogen, mirror-like composition is converted to the high-hydrogen composition, which is transparent and neutral gray. The device now acts as a transparent window, as is shown in FIG. 1A by means of the dashed line. When reversing the current, the switching film 3 returns to the low-hydrogen state, which is mirror-like and non-transparent, as is shown in FIG. 1B. The switching time is comparable to that of conventional electrochromic devices. The device can operate at room temperature. Once the mirror has reached the desired optical state, virtually no current will flow through the device. This means that the display will hold information with a very low power.

Figure 2:
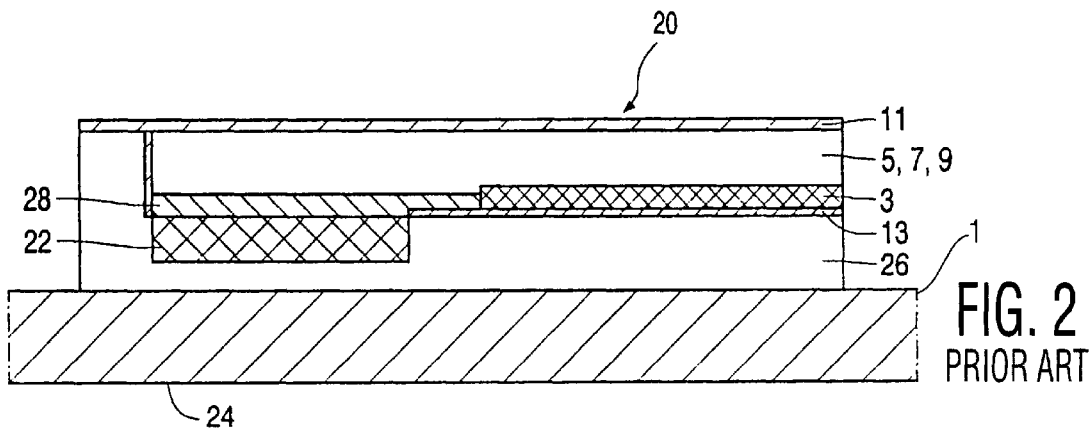
FIG. 2 is a cross-section of a pixel element of a switching mirror display according to the prior art.

The display is viewed from a side of the substrate, which is opposite to the side of the substrate on which the stack is deposited. A problem with the switching mirror device according to the prior art is that at the viewable side 24 of pixel element 20, i.e. the side from which the display is viewed, an element 22 of a so-called active matrix is visible, as is shown in FIG. 2. This active matrix (Thin Film Transistors, rows, columns, storage capacitors, etc.) comprises the electric elements that are necessary for switching the pixel elements. The active matrix is embedded in an embedding layer 26, which is also comprised in the pixel element. The active matrix is electrically connected to the electrode layers 13, 15. An isolation layer 28 isolates the active matrix element 22 from the layers of the stack.

In the configuration according to the prior art, the surface area occupied by the active matrix cannot be used for the optically active layer 3. This reduces the aperture of the display if the display is viewed from the viewable side 24. In particular, as the driving circuits are relatively complex and since the transistors are preferably made relatively large in order to handle the high currents needed for charging the switching mirror display, the aperture is relatively small.

Figure 3A:
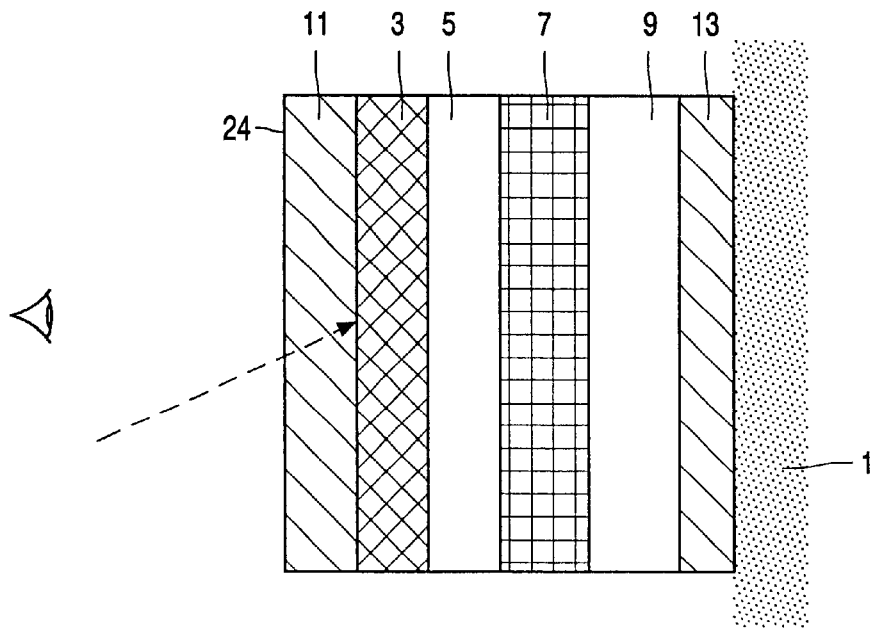
FIGS. 3A, 3B show a stack of layers of a switching mirror display according to the invention.
Figure 3B:
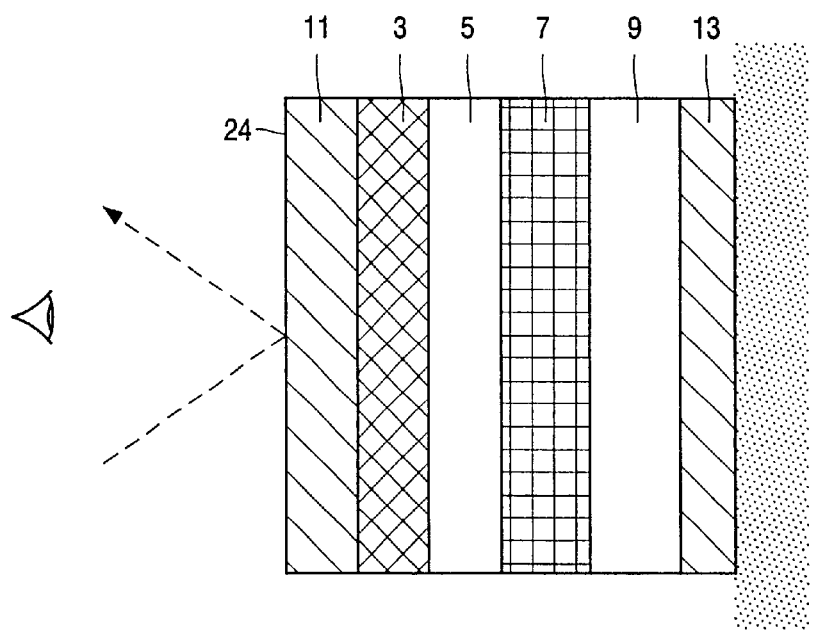

FIGS. 3A, 3B show a stack of layers of a switching mirror display according to the invention. In this case, the display is viewed from a side 24 of the substrate on which the stack is deposited. The order of the stack comprising the switching layer 3 has been reversed. This means that, in an order starting from the surface of the substrate, the stack comprises a first layer for storing hydrogen 9, a second layer for conducting hydrogen 7 and the switchable layer 3.

The stack is sandwiched between electroconductive electrode layers 11 and 13. The optically switchable material 3 is switched from a state of reflecting light to a state of absorbing light by changing a density of hydrogen. Applying a DC voltage on the electroconductive layers changes the density of hydrogen.

Good results were obtained with a stack of layers wherein the second layer comprises an electrolyte material, e.g. $ZrO_2H_x$, a separation layer 5 being present between the second layer 7 and the switchable layer 3, and the first layer 9 comprises $GdMgH_x$.

Figure 4:
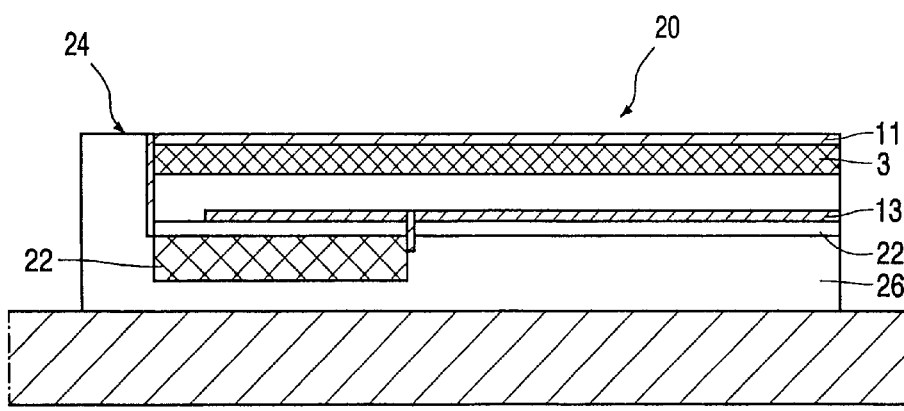
FIG. 4 is a cross-section of a pixel element of a switching mirror device according to the invention.

FIG. 4 is a cross-section of a pixel element 20 according to the invention. The order of the layers of the stack is reversed (as shown in more detail in FIGS. 3A, 3B) and the switching layer 3 extends across the active matrix element 22. The electric switching means are thus positioned behind the layer of optically switching material with respect to the viewable side 24 of the display device. When the switching layer is switched from a reflecting state to an absorbing state and reversibly, the active matrix element 22 is not visible. The active matrix element does not determine the aperture any longer, and consequently, the aperture is increased.

The switching layer 3 also conceals the conducting layer 13 located between the substrate and the switching layer. Therefore, the conducting layer 13 does not need to be transparent and may comprise metal, which improves the conductivity.

Since the transparent state of the switching mirror is not required, a second $LMgH_x$ layer can be used as a storage layer (L represents Ni or Y or an element of the Lanthanide series). Thus, the hydrogen storage layer comprises essentially the same compounds as the switchable layer, but the mutual ratio in which the various compounds occur in the layer may deviate from that in the switchable layer.

This has the advantage that the storage layer (9) can be thinner, resulting in shorter transportation times for the hydrogen and consequently a faster display. Moreover, for switching between the reflecting and the absorbing state, less charge (H-ions) needs to be transported, i.e. less current is needed for switching. Typically, for a 100 nm thin $Gd_{40}Mg_{60}$-hydride layer, a charge of about 0.1 $C/cm^2$ is needed for transporting all hydrogen from one layer to another in order to switch between the transparent and the reflecting state. For switching only between the reflecting and the absorbing state, less H has to be transported (requiring about 0.05 $C/cm^2$).

Such a device may be used for an application where only switching between the reflective and the absorbing state is necessary. If the viewable side 24 of the display device is provided with a scattering foil, the contrast of the display is improved. Due to the presence of the foil, switching-mirror pixels in the reflecting state will look white, whereas switching mirror pixels in the absorbing state will look black. Such a type of display may be used as e.g. a document reader. This principle, combined with color filters, will yield a full-color document reader.

Alternatively, the surface of the reflecting layer could be intentionally roughened to create the desired scattered reflection to provide a white or black looking reflective state.

In summary, the invention relates to a switching device having shorter switching times. The device comprises a switchable layer 3, which is switched between a reflecting and an absorbing state by changing a hydrogen content of the switchable layer 3. Applying a DC voltage on electroconductive layers 11, 13 changes the hydrogen content. These electroconductive layers 11, 13 sandwich a stack of layers comprising the switchable layer 3 and a hydrogen storage layer 9. The hydrogen storage layer comprises the same material as the switchable layer 3, viz. $LMgH_x$ and preferably $GdMgH_x$. The storage layer may be made thin, leading to relatively short hydrogen transportation times and a relatively fast display. The device may be further improved by applying a scattering foil.

It should be noted that the above-mentioned embodiments illustrate rather than limit the invention, and that those skilled in the art will be able to design many alternative embodiments without departing from the scope of the appended claims. This holds in particular for embodiments related to the applications as indicated in the cited prior-art document U.S. Pat. No. 5,905,590. In the claims, any reference signs placed between parentheses shall not be construed as limiting the claim. Use of the verb "to comprise" and its conjugations does not exclude the presence of elements or steps other than those stated in a claim.

What is claimed is:

1. A device which is reversibly switchable between at least a first state of reflecting light and a second state of absorbing light, said device comprising a stack of layers including a switchable layer (3) of an optically switchable material which brings about a switch from the first state to the second state of the device by changing a density of hydrogen, the stack further including a layer for storing hydrogen (9), separated from the switchable layer, which comprises a material comprising essentially the same compounds as the switchable layer (3).

2. A device as claimed in claim 1, wherein the device is a display device having pixel elements (20) which are reversibly switchable between the at least first state of reflecting light and the second state of absorbing light, said pixel elements (20) comprising said stack of layers.

3. A device as claimed in claim 2, wherein the device has a viewable side (24) which is provided with a scattering foil.

4. A device as claimed in claim 2, wherein a surface of the switchable layer is roughened so as to scatter light.

5. A device as claimed in claim 1, wherein the optically switchable material comprises $LMgH_x$, in which L represents Ni, Sc or Y or an element of the Lanthanide series.

6. A device as claimed in claim 2, wherein the display device has a viewable side (24) and electric switching means (22) for switching said switchable layer (3), and wherein the electric switching means (22) are positioned behind the switchable layer (3) with respect to the viewable side (24) of the display device.

* * * * *